US008997143B2

(12) United States Patent
Sherwin et al.

(10) Patent No.: US 8,997,143 B2
(45) Date of Patent: *Mar. 31, 2015

(54) DATA BOUNDARY MANAGER FOR ADDRESSABLE ADVERTISING

(75) Inventors: Jeffrey Sherwin, Scarsdale, NY (US); Nickolas James Heudecker, San Jose, CA (US); John Raymond Mick, Jr., Sunnyvale, CA (US)

(73) Assignee: This Technology, Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/444,303

(22) Filed: Apr. 11, 2012

(65) Prior Publication Data

US 2013/0276025 A1    Oct. 17, 2013

(51) Int. Cl.
H04N 7/10       (2006.01)
H04N 21/25      (2011.01)
H04N 21/258     (2011.01)

(52) U.S. Cl.
CPC ....... *H04N 21/252* (2013.01); *H04N 21/25891* (2013.01)
USPC .................... 725/35; 725/12; 725/14; 725/25

(58) Field of Classification Search
CPC ............ H04N 21/258; H04N 21/4532; H04N 21/44222; H04N 21/252; H04N 21/25891
USPC ............................ 725/22, 32, 34–36, 12, 25
See application file for complete search history.

(56) References Cited

U.S. PATENT DOCUMENTS

| | | | | |
|---|---|---|---|---|
| 5,754,938 A | * | 5/1998 | Herz et al. | 725/116 |
| 2006/0287915 A1 | * | 12/2006 | Boulet et al. | 705/14 |
| 2009/0150930 A1 | * | 6/2009 | Sherwin et al. | 725/35 |
| 2011/0015989 A1 | * | 1/2011 | Tidwell et al. | 705/14.43 |
| 2011/0016479 A1 | * | 1/2011 | Tidwell et al. | 725/9 |
| 2011/0016482 A1 | * | 1/2011 | Tidwell et al. | 725/14 |
| 2011/0264530 A1 | * | 10/2011 | Santangelo et al. | 705/14.64 |

OTHER PUBLICATIONS

NIST (National Institute of Standards and Technology), Guide to Protecting the Confidentiality of Personally Identifiable Information (PII), Special Publication 800-122, Apr. 2010. p. ES-1.*
Society of Cable Telecommunications Engineers ANSI/SCTE 130-3 2010; Digital Program Insertion—Advertising Systems Interfaces Part 3 Ad Management Service (ADM) Interface; 2010.*

* cited by examiner

*Primary Examiner* — Benjamin R Bruckart
*Assistant Examiner* — Michael M Nguyen
(74) *Attorney, Agent, or Firm* — Lowenstein Sandler LLP

(57) ABSTRACT

A computer implemented method and system for managing audience data for advertisement placements is disclosed. A server receives a source signal stream comprising metadata and an advertisement space. The server extracts from the metadata a channel identifier, a private client identifier, and information about an intended audience of interest to advertisers. The server identifies a placement opportunity including an owner of the advertisement space based on the channel identifier. The server purges at least some of the extracted information about the intended audience when the owner of the advertisement space is identified as a national network. The server identifies an amount of information about the intended audience to purge and subsequently to fetch for the national network based on a business arrangement between the national network and a service provider, which the server enforces and enables.

23 Claims, 5 Drawing Sheets

DATA BOUNDARY MANAGER FOR ADDRESSABLE ADVERTISING

FIELD OF THE INVENTION

The present invention relates generally to service provider video networks, and more particularly to a method and system for managing information related to an intended audience for advertising placements in signal streams.

BACKGROUND OF THE INVENTION

In the cable television industry there are at least two types of organizations capable of selling advertisement space. One is a programming network (e.g., NBC, ABC, CBS, TBS, etc.) and the other is the local cable service provider (e.g., Comcast, Time Warner, etc.). Some service providers fall somewhere between the two, generally referred to as Multiple System/Service Operators (MSO—a cable TV organization that owns more than one cable system and may prove broadband Internet service). Programming networks sell advertising space that may appear in every market (i.e., nationally or regionally) regardless of the identity of the cable operator or MSO.

An MSO may sell advertisement space directed to local or regional businesses, and can target or swap out national advertisements for local or regional market ads. In addition, MSOs own or can locate individual subscriber set top boxes, and can target local advertisements for all subscribers in a region, town, or down to a specific subscriber. Advertisements targeted to particular intended audiences are made possible when the MSO gains access to personal identifiable information (PII) about their subscribers, made available within set top boxes or via the Internet. PII may include the location of a set top box including its hardware MAC address, marketing information, such as which programs and commercials have been viewed, and direct subscriber personal information such as a subscriber's name, home address, subscription or order history, and credit score.

This information is private yet valuable to advertisers, both MSOs and national networks included. A national network may approach an MSO to swap in and out Video-On-Demand (VOD) advertisements using an MSO's dynamic advertisement insertion capabilities and may obtain PII data in order to enhance revenues. The MSO, in turn, can charge a premium to the national network for PII.

There are at least two barriers generally preventing an MSO from revealing PII: one legal and the other monetary. Legally, an MSO cannot reveal PII that can identify a specific individual. Commercially, a national network that gains access to a local or regional market provides may threaten the MSO's own local media business. An MSO may not want to give away local or regional information because the MSO does not want to have a national network, with its wide-ranging resources, competing with their local media sales. For example, if a network obtains information about subscribers in the New York metropolitan area, then the national network may begin selling ads for a premium to companies that are only in the New York metropolitan area, which a local advertiser may not be able to afford. However, it may be possible for an MSO to satisfy all parties, both legally and commercially, by purging certain PII that identifies an individual subscriber or other local or regional market information but still provide certain national-level statistical demographic information, e.g., the number of people who are male or have a certain income level.

Accordingly, what would be desirable, but has not yet been provided, is a method and system for filtering personal identifiable or regional information about cable subscribers while providing certain statistical information to national networks.

SUMMARY OF THE INVENTION

The above-described problems are addressed and a technical solution is achieved in the art by providing a computer implemented method and system for managing audience data for advertisement placements. A computer implemented method and system for managing audience data for advertisement placements is disclosed. A server receives a source signal stream comprising metadata and an advertisement space. The server extracts from the metadata a channel identifier and information about an intended audience of interest to advertisers. The server identifies a placement opportunity including an owner of the advertisement space based on the channel identifier. The server purges at least some of the extracted information about the intended audience when the owner of the advertisement space is identified as a national network. The server identifies an amount of information about the intended audience to purge and subsequently to fetch for the national network based on a business arrangement between the national network and a service provider, which the server enforces and enables.

In an embodiment, the server may target the advertisement decision to the intended audience based on the remaining extracted information about the intended audience. The remaining extracted information about the intended audience may be at least one statistic of a national market. The at least one statistic may be made available only to the national network for a predetermined period of time. The national network may be charged for the at least one statistic. The premium charged may be based on at least one of by network, by show, by time, and by device.

The purged information about the intended audience may be personal identifiable information that identifies an individual person. The personal identifiable information may include at least one of a hardware MAC address, a name, a post office address, a subscription or an order history, and a credit score. The purged information about the intended audience may identify a market associated with a regional or local service provider. In one embodiment, the server may be configured to provide compensation to the regional or local service provider from the national network in exchange for permitting the national network to have access to the information that identifies the market associated with the regional or local service provider.

In one embodiment, identifying an owner of the advertisement space based on the channel identifier comprises transmitting the channel identifier to an ad management service and receiving, from the ad management service, a client identifier. The server may then transmit the client identifier and the channel identifier to a subscriber information service and receive, from the subscriber information service, a list of audience qualifiers including the extracted information about the intended audience correlated to the client identifier and the channel identifier. Purging at least some of the extracted information about the intended audience may include purging at least some of the audience qualifiers that identify an individual person or identifies a market associated with a regional or local service provider.

In one embodiment, identifying a placement opportunity in the advertisement space based on remaining extracted information about the intended audience may include transmitting, to an ad decision service or a Digital Video Ad Serving Template (VAST), an ad call for each element of the list of audience qualifiers remaining after purging and the channel identifier and receiving, from the ad decision service or the VAST, at least one advertisement targeted to the intended audience.

In one embodiment, requesting an advertisement decision based on the placement opportunity identified may include associating a unique signal ID with the at least one each targeted advertisement and transmitting the at least one targeted advertisements to a client.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
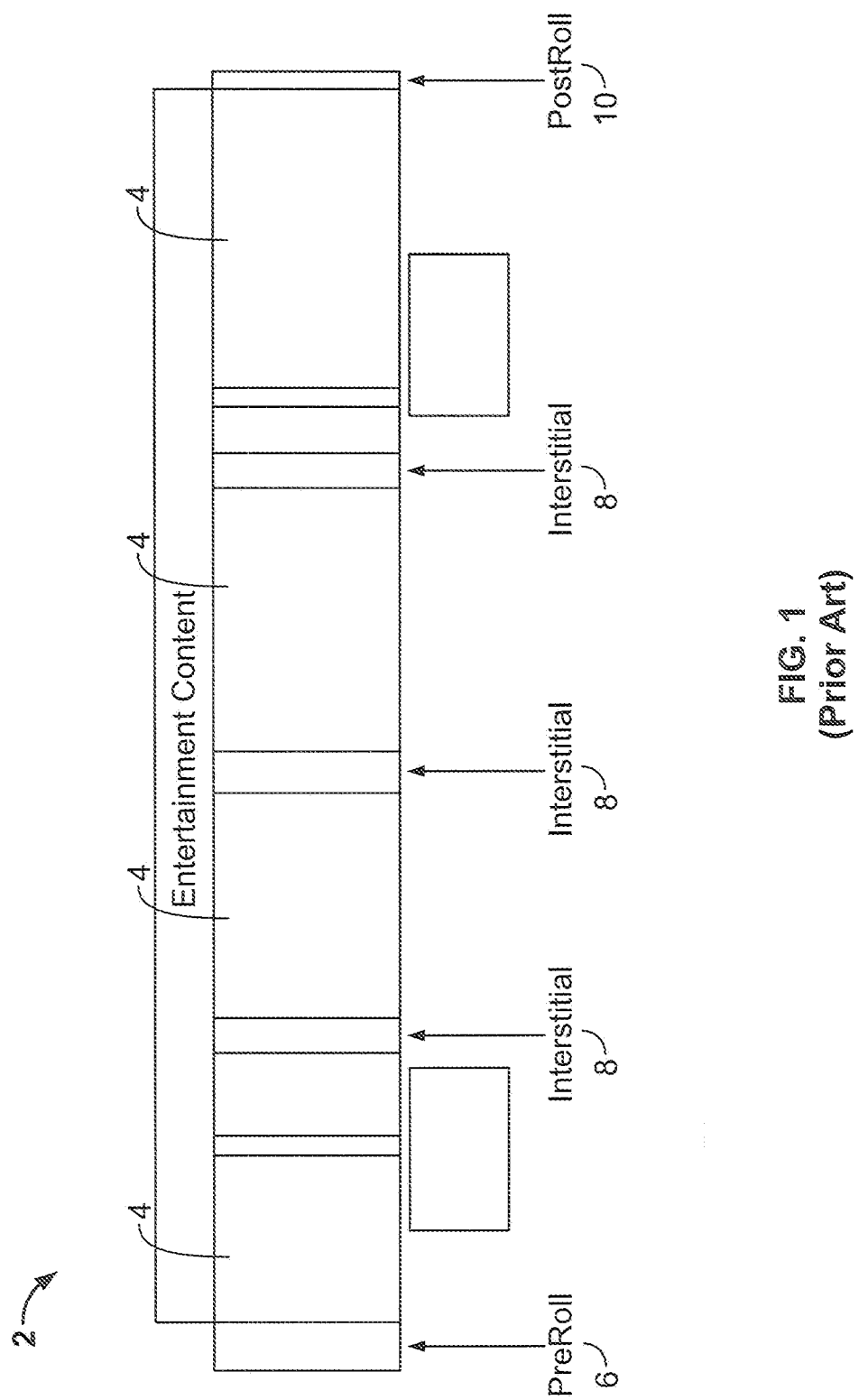
FIG. 1 illustrates a conventional linear or video-on-demand model for advertisement placement.

Traditionally, programming of broadcast and cable television and radio, including content (i.e., the video or audio program) and (the placement of) advertisements in a video or audio signal stream, has followed a linear model. Programming may be linear in the sense that a program begins and is streamed and in progress when a user chooses to view entertainment content. FIG. 1 illustrates a conventional linear or video-on-demand (VOD) model for advertisement placement. Entertainment content 2, when processed as a digital data stream over a cable network, may be divided into a number of time intervals. The time intervals 4 include time reserved for a viewed program (content), such as "Golden Girls." The intervals 6, 8, 10, represent sections of time reserved for advertisements or "avails." These "avails" may be viewed as advertisement placement opportunities. As used herein, a "placement opportunity" was traditional called an avail and is sometimes referred to as a slot (spots into slots). A placement opportunity (PO) is a construct that represents an opportunity to insert an advertisement or entertainment content, and defines the rules for that opportunity, such as its duration, interactivity, ownership, and technical constraints.

In linear over-the-air or traditional cable TV broadcasting, each of the intervals 6, 8, 10 are known as breaks with no distinction of ordering. Advertisement time may occur before, during, or after the intervals 4 in the breaks, each break comprising a "pod," each "pod" containing one or more "avails." The list of programs and breaks may be received by a service provider in a schedule, and may provide additional information as to which entity, e.g., a network, an operator, or other entity, owns each of the avails. A traffic and billing system then reads the schedule and identifies which network, operator, or other entity has the right to place an advertisement during a particular avail of a given pod during a given break. Existing cable systems provide static sales—e.g., a 30 second spot in a particular geographic market which may be inserted into one or more of the breaks 6, 8, 10.

In non-linear systems, such as Video-on-Demand (VOD), the intervals 6, 8, 10 may take on new meanings. The interval 6 is called a pre-roll, i.e., the space in a video that occurs immediately after a user clicks to start a VOD video. The interval 10 is known as a post-roll, i.e., the space after all of the VOD video segments have finished playing. The intervals 8 may be mid-rolls, i.e., mini-breaks in the middle of a VOD video, or may be interstitials, i.e., pod-like locations between consecutive VOD video segments. VOD advertisement placement opportunities may appear based on space, time, content, and user context and may be highly non-linear (i.e., the user chooses to initiate the playing of content and in response, the content starts). All of the intervals 6, 8, 10 in such play lists are ripe for the insertion of advertisements, i.e., advertisement placement opportunities.

As used herein, the term "binding" refers to an identification of signals and content within a placement opportunity (PO). PO's are frequently created for broad amounts of content that are not yet published (i.e., any show on TNT network in the evening). When the show airs and a signal is detected, the signal is bound to the relevant PO's for that show.

As used herein, the term "impression" refers to a showing of an ad to a single viewer. For example, if a 30 second spot is placed in 50,000 video-on-demand (VOD) streams and it is known that 30,000 of the streams actually played the ad, then 30,000 impressions of that ad have been generated.

As used herein, a "status notification" may be, but is not limited to, an HTTP call from a VOD server with a unique ID that was created when a decision was delivered.

As used herein, the term "break" refers to all of the space in a stream between entertainment content. For example, a group of 4 consecutive 30 second spots between 2 segments of "Two and a Half Men" may be considered as a single break.

In the traditional model for the placement of ads in television programming, avails are specified by a simple combination of channel and time and decided weeks ahead of broadcast. However, new cable content delivery systems permit advertising spots of varying duration, permit different levels of interactivity (e.g., polling or linking) through the use of buttons on a remote control, may be defined by geography, etc. In a world where TV viewing is becoming increasingly non-linear (e.g., video-on-demand (VOD), networked-based personal video recorders (PVR), interactive programs), a key goal of advertisement opportunity placement systems is to determine how to define placement opportunities that are non-deterministic and manifest dynamically. Advanced advertising needs to accommodate advertisement placement opportunities that are invoked by user events, which may include anything from playback of a VOD title to pausing one's DVR. As the scope of potential placement opportunities expands accordingly, it becomes necessary to precisely define those placement opportunities with attributes representing relevant business rules. These may be used to specify such things as inventory splits, quantity, duration, and position of ad breaks (pre-roll, mid-roll, post-roll); placement of pause ads and overlays; and levels and types of interactivity.

On the Internet, a content publisher and an advertiser may be isolated from one another, with an advertising network acting as an intermediary. On TV, the advertising network was formerly the national network, the cable network, or the cable operator, that had fixed avails. However, emerging advanced advertising standards for dynamic television provide an opportunity for content providers to derive value from a cable operator's ad placement infrastructure by creating new and more flexible advertising inventory (i.e., Potential Viewership*Placement Opportunities=Advertising Inventory). This new business model imposes unique technical challenges: unlike the Internet, where browsers access/display content and then are separately "referred" to a shared ad network, the cable television infrastructure selects and assembles both the advertisement and the content together in the network and delivers the combined result to customers' set top boxes. For this to work, cable television advanced advertising networks may need to at least partially operate within the infrastructure of an MSO. To achieve optimal addressability and user experience and achieve bandwidth efficiencies, advertising service elements and digital delivery components need to be located close to the edge of a network, i.e., at or near set top boxes. Decisions need to be made based upon relevant context (infrastructure, platform, content, geography, demographics, etc), which are applicable to non advertisements as well (e.g., suggested content). By making placement decisions and insertions at the time of a user request—or even at the appropriate times during content playout—fully dynamic ad placement may be achieved.

Certain embodiments of the present invention are compatible with and make use of elements defined according to the SCTE-130 standard. The SCTE-130 standard provides a standardized and extensible message based interface defining a minimal set of cooperating logical services necessary to communicate placement opportunities, placement decisions, and placement related event data necessary for accountability measurements. SCTE-130 defines an extensible framework of interfaces among a set of advertising system logical services. The SCTE-130 standard encompasses: a minimal set of cooperative logical services needed to implement advanced addressable advertising systems; the core data types and extensible message framework forming a vocabulary needed to communicate among the defined logical services; the interfaces among these logical services using the core data types and messages; and, mechanisms for extensibility that allow innovation while preserving backward compatibility with already deployed systems—thereby reducing the complexity for incorporating new features within the standard.

The normative parts of the SCTE-130 standard define mechanisms for integrating systems implementing features such as VOD-based advertising, linear-based advertising, enhanced advertising capabilities such as ad rotation groups (rotation groups refer to placement opportunities that run in rotation so that the same add is not viewed again immediately), subscriber-based addressing for advertising or content tailoring, extension points for more advanced advertising or addressing features, logical services that are implemented as one or more physical systems created by the same vendor, deployment of a logical service that may simultaneously include systems from one or more vendors, and an implementation that may incorporate one or more of the defined logical services and interfaces The SCTE-130 standard defines a set of logical services comprising an advanced advertising system. Each logical service may itself be a complex system. In an embodiment, one or more of the following logical services may be used by or interact with certain embodiments of the present invention.

An Ad Management Service (ADM) defines messages in support of ad insertion activities. The primary consumer of these messages is an Ad Decision Service (ADS). The message interfaces exposed by an ADM permit both pre-configured ad decisions as well as real-time fulfillment models. An ADM implementation may incorporate some simple ad selection rules (e.g., ad rotations) but more complex ad decisions are the responsibility of an ADS.

An Ad Decision Service (ADS) determines how advertising content is combined with non-advertising (i.e., entertainment) content assets. The decisions made by an ADS may be straightforward (i.e., specific ad content placed at a specific time in a specific asset) or arbitrarily complex (based on subscriber data, advertising zone, etc.).

A Content Information Service (CIS) manages metadata describing assets (both advertising assets and non-advertising assets) available to the other SCTE-130 logical services. The CIS provides query and notification interfaces to the other logical services. The query service is available on an ad-hoc basis and may be called by any other logical service at any time without any prior registration. Queries specify values or patterns to be sought in the query message metadata and the specified matching information (or an error indication) is returned in a response message.

The Content Information Service (CIS) is a storage and distribution engine. It stores metadata about entertainment and advertising assets; provides notifications to registered clients when metadata is modified; registers, receives and processes notifications from other CIS services; and supports real-time metadata queries. The CIS permits an Advertising Manager (ADM) and/or Ad Decision Service (ADS) to retrieve and utilize content metadata in their advanced advertising decision processing.

A Placement Opportunity Information Service (POIS) may hold, maintain, and retain descriptions of placement opportunities. The POIS may also contain attributes and constraints for each placement opportunity, platform compliance, rights, and policies of the content in which the placement opportunity exists. These placement opportunities are content specific, therefore attributes and constraints may vary by network, geographic region, or other content distribution dimension.

The POIS is a Placement Opportunity (PO) storage and inventory execution engine. It stores PO metadata and statistics; provides notifications to registered clients when PO metadata is modified; registers, receives and processes notifications from other POIS services; and supports real-time PO metadata queries. Through the POIS appliance, an Advertising Manager (ADM) and/or Ad Decision Service (ADS) can retrieve and utilize placement opportunity metadata in their advanced advertising decision making.

The Subscriber Information Service (SIS) manages per-subscriber information relevant to ad placement decisions. The SIS provides a mapping between subscriber or client identifiers, such as a MAC address, serial number, etc., and subscriber or audience attributes, e.g., age, sex, location of a subscriber.

The term "computer" or "computer platform" is intended to include any data processing device, such as a desktop computer, a laptop computer, a tablet computer, a mainframe computer, a server, a handheld device, a digital signal processor (DSP), an embedded processor (an example of which is described in connection with FIG. 5), or any other device able to process data. The computer/computer platform is configured to include one or more microprocessors communicatively connected to one or more non-transitory computer-readable media and one or more networks. The term "communicatively connected" is intended to include any type of connection, whether wired or wireless, in which data may be communicated. The term "communicatively connected" is intended to include, but not limited to, a connection between devices and/or programs within a single computer or between devices and/or separate computers over a network. The term "network" is intended to include, but not limited to, OTA (over-the-air transmission, ATSC, DVB-T), packet-switched networks (TCP/IP, e.g., the Internet), satellite (microwave, MPEG transport stream or IP), direct broadcast satellite, analog cable transmission systems (RF), and digital video transmission systems (ATSC, HD-SDI, HDMI, DVI, VGA), etc.

Figure 2:
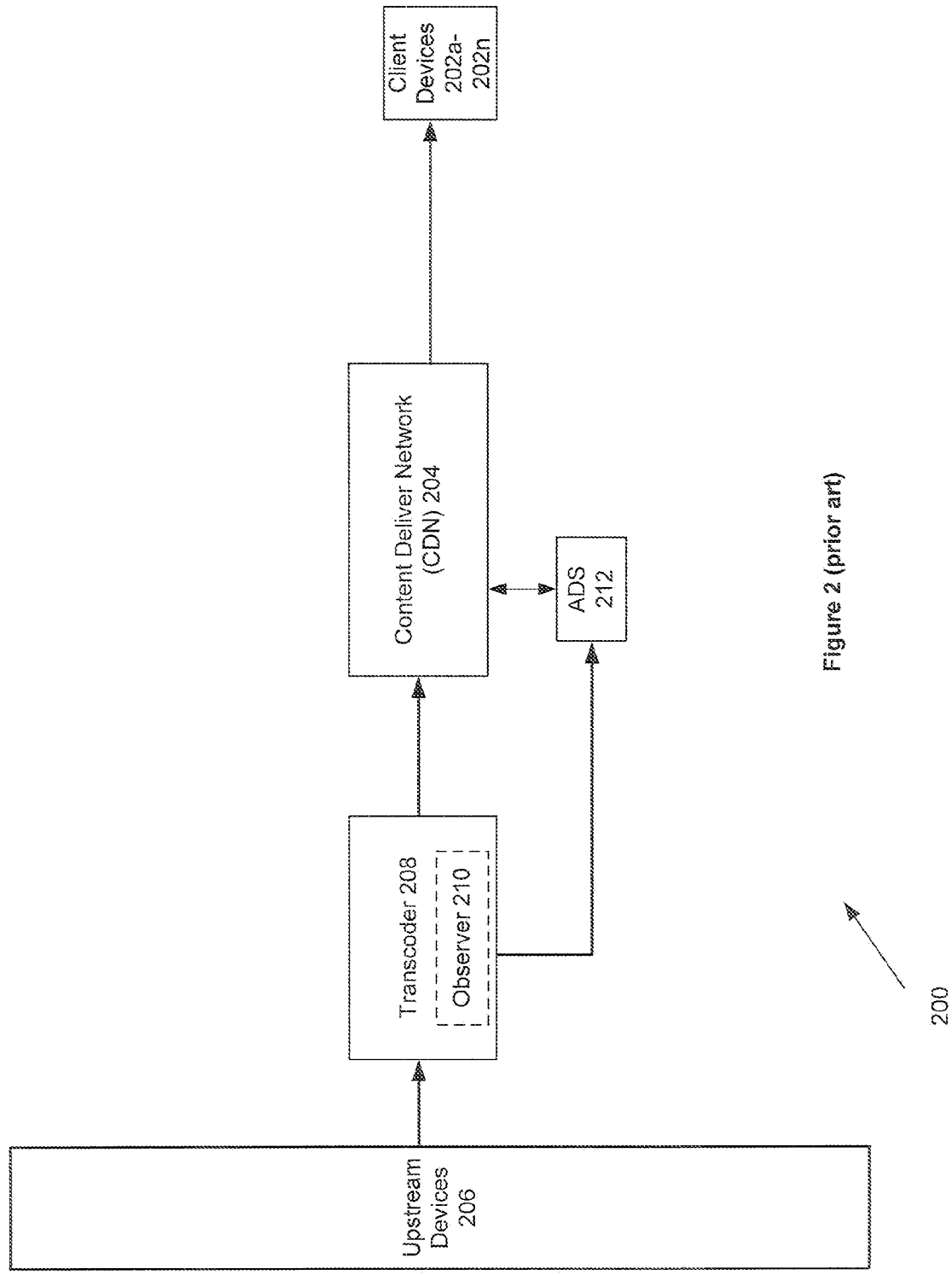
FIG. 2 depicts a configuration of a conventional Internet-based cable television infrastructure for performing advertising placement decisions in signal streams.

FIG. 2 depicts a configuration of a conventional Internet-based cable television infrastructure 200 for performing advertising placement decisions in signal streams. On TV, the advertising network was formerly the national network, the cable network, or the cable operator. However, unlike the Internet, where browsers access/display content and then are separately "referred" to a shared advertisement network, the Internet-based cable television infrastructure 200 selects and assembles both the advertisement and the content together and delivers the combined result to customers' "smart appliances" 202a-202n (e.g., Internet ready televisions, radios, smartphones, tablets, PCs, etc.).

Recently, smart appliances 202a-202n, such as Internet-ready televisions, have become capable of receiving content from Internet streaming services, such as Netflix movies, Pandora streaming radio, etc., over WiFi or direct Ethernet connections. When a user clicks on an icon for an "app" that appears on the television set corresponding to one of these services, the content is streamed to the smart appliance 202a-202n from a content delivery network (CDN) 204 directly to the application running in the smart appliance 202a-202n without the need for a set top box.

A set top box may be configured to decode an analog representation of two states of a digital signal, as is known in the art, that is continuously streamed and pushed to the set top box through a broadcast facility over a coaxial or fiber optic cable and the set top box tunes to that channel and displays the content. When a user watches Internet-delivered program content, a browser within the smart appliance 202a-202n fetching video in predetermined time chunks—generally two sometimes three, sometimes ten second chunks. The fetched chunks of video are seamlessly stitched together dynamically in the app software and then displayed so as to appear as a smooth video on the smart appliance 202a-202n.

The MSO may wish to rebroadcast video streams on smart appliances. Unfortunately, every connected device, including smart appliances, needs to obtain video in the format that it can consume. Apple, Microsoft, Adobe, etc., have very specific and incompatible formats. To overcome this problem, each of these companies has constructed facilities called content deliver networks (CDN) 204 where a "set top box" for each channel is configured to receive broadcasts from satellites. A signal received by a "set top box" from upstream devices 206 is fed to a transcoder 208 to place the signal in a desired format and to fragment the formatted signal into the predetermined (e.g., 2 second) chunks of data. These chunks are then stored at the CDN 204 on server farms located physically close to where the content is to be delivered.

To identify a particular channel data stream, including times when a program has ended and before the next program begins, i.e., a placement opportunity, a q-tone is inserted in the digital stream a predetermined time before the next program begins. An observer 210, which may be the transcoder 208, informs an ad service (ADS) 212 of the arrival of the q-tone for subsequent placement of one or more advertisements into the channel data stream. The ad service 210, in turn, is waiting for the subsequent arrival of requests from CDNs 204 to place advertisements into breaks in the data stream.

Figure 3:
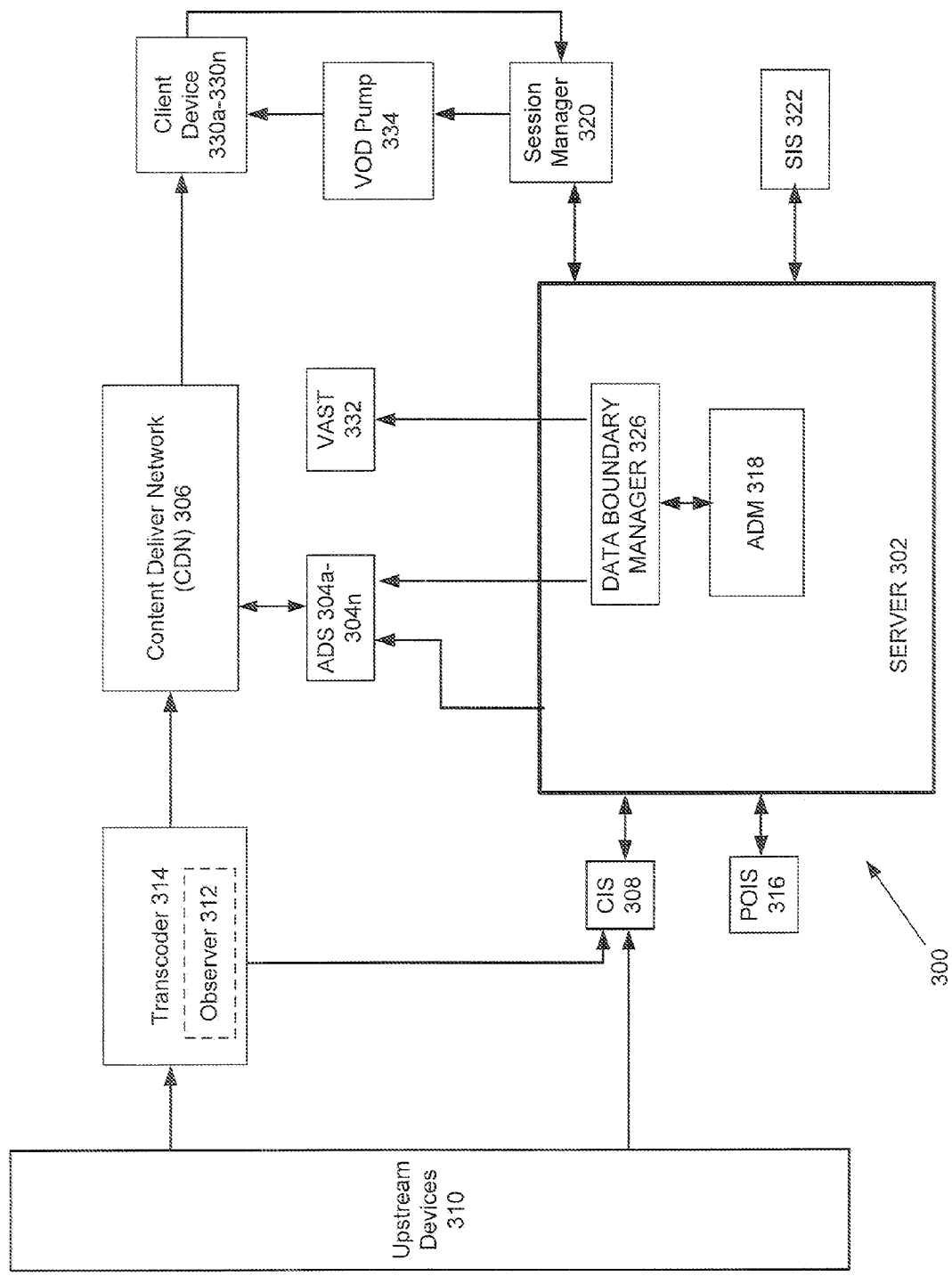
FIG. 3 depicts a configuration of a system for managing audience data for advertisement placements in network signal streams, according to an embodiment of the present invention.

FIG. 3 depicts a configuration of a system 300 for managing audience data for advertisement placements in network signal streams, according to an embodiment of the present invention. The system 300 may be executed on a server 302, interconnected by one or more networks (not shown) communicatively connected to ADSs 304a-304n. The ADSs 304a-304n are configured to place advertisements into breaks in a data at the request of a CDN 306.

The server 302 is configured to communicate with a CIS 308 for receiving one or more source signal streams (e.g., digital video, audio, etc.) from upstream devices 310 and corresponding q-tones (i.e., instances of SCTE-35 packets) from one or more observers 312, which may be incorporated within a transcoder 314. The transcoder 314 is also configured to deliver IP video, audio, etc., in predetermined "chunks" to the CDN 306 as described above.

The CIS 308 is also configured to extract metadata from the one or more source signal streams and from these pre-allocate a corresponding number of unconfirmed placement opportunities without signals and to bind the source signal stream to a plurality of premade, but unconfirmed placement opportunities. Part of the extracted metadata includes a channel identifier associated with a corresponding source signal stream.

A POIS 316 is configured to "confirm" unconfirmed placement opportunities by identifying temporal starting locations of the unconfirmed placement opportunities relative to both the content stream and a wall clock. The POIS 316 is configured to return a globally unique value, a UUID, referred to as a signal identifier or signal ID that uniquely identifies a PO as a confirmed PO and its starting location within the end-to-end operational system 300. The POIS 316 then inserts the signal ID and the channel identifier into other extracted metadata of the source signal stream using the appropriate in-band carriage format.

The server 302 also comprises an ADM 318. The ADM 318 is configured to identify an owner of a signal stream (a network or local/regional channel) having the channel identifier and at least one audience attribute (PII or local/regional market information). To identify the owner of the signal stream and the at least one audience attribute, the ADM 318 places a call to an external session manager 320. The ADM 318 transmits the channel identifier to the session manager 320, which provides the ADM 318 with a list of client identities indicative of a number of recipients currently viewing an identified channel owned either by a national network or a local or regional entity. The ADM 318 transmits the list of client identities and the channel identifier to the SIS 322, which provides the ADM 318 with a list of sets of audience qualifiers correlated to the client identities and the channel identifier. This list of sets of audience qualifiers correlated to the client identities and the channel identifier is representative of a list of recipient signal streams having the same channel identifier that are currently being "watched" by subscribers, where each subscriber in the list has a certain set of audience attributes (e.g., PII such as a hardware MAC address, a name, a post office address, a subscription or an order history, and a credit score). The audience attributes may also be indicative of information concerning a market associated with a regional or local service provider (e.g., all males 21 and over in a town or region).

The ADM 318 is also configured to obtain a plurality of targeted advertisements corresponding to the list sets of audience qualifiers correlated to the client identities and the channel identifier from the one or more ADSs 304a-304n. The ADM 318 receives, from the ADSs 304a-304n, the plurality of advertisements targeted to the list representative of the plurality of recipient signal streams.

The ADM 318 uses the signal ID plus a set of locally configured or learned targeting criteria to initiate a unique set of ad decision requests. The ad decision requests evolve into targeted ad decision requests to the appropriate decision owners and the results are a set of ad placement decisions correlating to the placement opportunities generated as a result of signal confirmation.

The ADM 318 is also configured to forward the obtained list of targeted advertisements to the one or more ADSs 304a-304n with PII or local/regional marketing information at least partially removed by an intervening data boundary manager 326 according to a set of rules programmed into the data boundary manager 326.

The CDN 306, in turn, inserts a predetermined list of ads into corresponding placement opportunities by placing ad calls to the one or more ADSs 304a-304n, the latter providing a list of ad decisions purged of PII or local/regional marketing information for ultimate delivery to smart devices (SD) 330a-330n.

Figure 4:
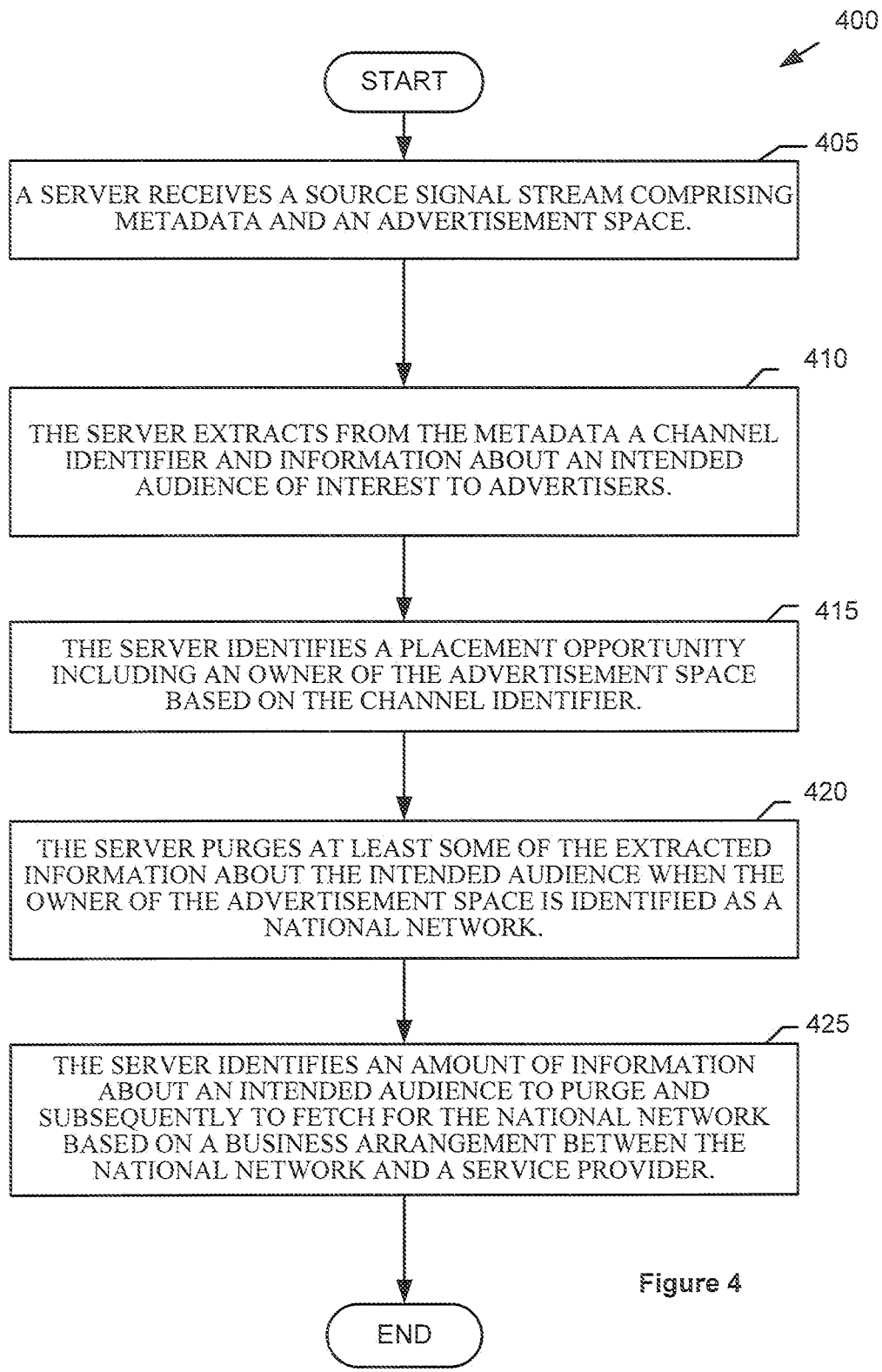
FIG. 4 is a flow diagram illustrating one embodiment of a method for managing audience data for advertisement placements, according to an embodiment of the present invention.

FIG. 4 is a flow diagram illustrating one embodiment of a method 400 for managing advertisement placements, according to an embodiment of the present invention. At block 405, the server 302 receives a source signal stream comprising metadata and an advertisement space. More particularly, the CIS 308 associated with the server 302 receives the source signal stream (e.g., in MPEG-2 format) from the upstream devices 310. At block 410, the CIS 308 extracts and forwards to the server 302 the metadata embedded within the source signal stream to the ADM 318 within the server 302. The extracted metadata includes a channel identifier and information about an intended audience of interest to advertisers. At block 415, the ADM 318 of the server 302 identifies a placement opportunity including an owner of the advertisement space (e.g., TBS (a network)) based on the channel identifier. More particularly, the ADM 318 obtains the identity of the owner of the advertisement space from the session manager 320 with the channel identifier employed as input. The ADM 318 identifies a placement opportunity from the POIS 316 described below.

At about the same time, a transcoder 314 associated with a specific vendor format for the source signal stream (e.g., TBS) receives the signal stream and converts the signal stream to IP video. The observer 312 of the transcoder 314 then places a web call to the CIS 308 to inform the CIS 308 that the q-tone for a specific channel ID has been observed.

The arrival of the SCTE-35 packet is an indication of a number of theoretical placement opportunities (POs) for the specified channel ID (e.g., TBS). Each unconfirmed PO has an estimated starting location known as a signal point. The signal point needs to be confirmed. When an actual ad insertion starting location is encountered in real-time, a software process in the POIS 316 confirms the actual time of the signal point. This confirmed signal point results in the generation of confirmed POs that are now ready for ad insertion.

When the CIS 308 receives the theoretical placement opportunities, the CIS 308 is configured to pre-allocate a corresponding number of unconfirmed placement opportunities without signals and to bind the source signal stream to a plurality of premade, but unconfirmed placement opportunities. Binding the source signal stream to a plurality of premade, but unconfirmed placement opportunities includes the CIS 308 extracting metadata including the channel identifier from the source signal stream.

As content is acquired by the CDN 306, the CDN 306 notifies the POIS 316, and the POIS 316 "confirms" the temporal starting location of a placement opportunity relative to both the source signal stream and a wall clock. The POIS 316 returns a globally unique value, a UUID, referred to as a signal identifier or signal ID that uniquely identifies a PO as a confirmed PO and its starting location within the end-to-end operational system. The POIS 316 then inserts the signal ID and the channel identifier into other extracted metadata of the source signal stream using the appropriate in-band carriage format.

At block 420, the ADM 318 of the server 302 employs the embedded data boundary manager 326 to purge at least some of the extracted information about the intended audience when the owner of the advertisement space is identified as a national network. At block 425, the server 302 identifies an amount of information about an intended audience to purge and subsequently to fetch for the national network based on a business arrangement between the national network and a service provider.

Purging at least some of the extracted information about the intended audience may include purging at least some audience qualifiers that identify an individual person or identifies a market associated with a regional or local service provider. Audience qualifiers that identify an individual person may include personal identifiable information (PII) described above, which, for example, may include a hardware MAC address, a name, a post office address, a subscription or an order history, or a credit score associated with an individual person. To identify and purge MI or regional or local marketing information, the data boundary manager 326 may be programmed according to a set of rules.

To identify the owner of the advertisement space, the ADM 318 of the server 302 transmits the channel identifier to the session manager 320, which provides the ADM 318 with a list of client identities indicative of a number of recipients currently viewing an identified channel owned either by a national network or a local or regional entity. ADM 318 transmits the list of client identities and the channel identifier to the SIS 322 which provides the ADM 318 with a list of sets of audience qualifiers correlated to the client identities and the channel identifier. This list of sets of audience qualifiers correlated to the client identities and the channel identifier is representative of a list of recipient signal streams having the same channel identifier that are currently being "watched" by subscribers on the smart devices 330a-330n, where each subscriber in the list has a certain set of audience attributes, which may include PII and/or regional or local marketing information that may pose a threat to an MSO's regional or local advertisers.

If the owner of the advertisement space is a national network, the ADM 318 transmits the list of sets of audience qualifiers correlated to the client identities and the channel identifier to data boundary manager 326. Based on the channel identifier and a set of rules associated with the channel identifier, in one embodiment, the data boundary manager 326 purges (i.e., removes) PII or local/regional marketing information present in the list of sets of audience qualifiers.

The ADM 318 may then forward the list of sets of audience qualifiers to the one or more ADSs 304a-304n with PII or local/regional marketing information at least partially removed.

In one embodiment, once the data boundary manager 326 has purged PII or regional or local marketing information, there may still be certain remaining information in the purged list of sets of audience qualifiers that may be employed by the server 302 to target the advertisement decision to an intended audience. In one embodiment, the remaining information in the purged list of sets of audience qualifiers may include statistics of a national market (e.g., the number of males over 21 currently viewing TBS). This remaining information may be made available only to the identified national network (e.g., TBS) and no other network (e.g., CBS). In one embodiment, the remaining information may be made available to the identified national network for a limited period of time. In one embodiment, the server 302 may be configured to charge the identified national network a premium for providing access to the remaining information. The premium charged may be based on the particular network, by show, by time, or by device.

For example, a national network (e.g., TBS) may desire to target ads to woman. The MSO (e.g., Comcast) may be willing to provide this information to the national network for a price of $1/10^{th}$ of 1 penny or a dollar per thousand impressions for every data stream that includes metadata that includes the sex of the viewer. This information would not be made available to another national network (e.g., Discovery channel) because the second network has not agreed to pay these fees.

In another embodiment, the server 302 may be configured to store remaining information about the intended audience that includes information that identifies a market associated with a regional or local service provider. This information may be provided to the identified national network in exchange for providing compensation to the regional or local service provider.

In one embodiment, the server 302 requests an advertisement decision based on the placement opportunity identified. More particularly, the server 302, on request from the CDN 306, transmits to the one or more ADSs 304a-304n or VAST 332 an ad call for each element of the list of audience qualifiers remaining after purging and the channel identifier. The server 302 receives from the ADSs 304a-304n or VAST 332, a plurality of advertisements targeted to the list representative of the plurality of recipient signal streams associated with the identified network. The server 302 may then employ the POIS 316 to insert the targeted ads into designated time intervals of the stream. Finally, the server 302 transmits the stream to an end user via, e.g., a VOD pump (server) 334.

Figure 5:
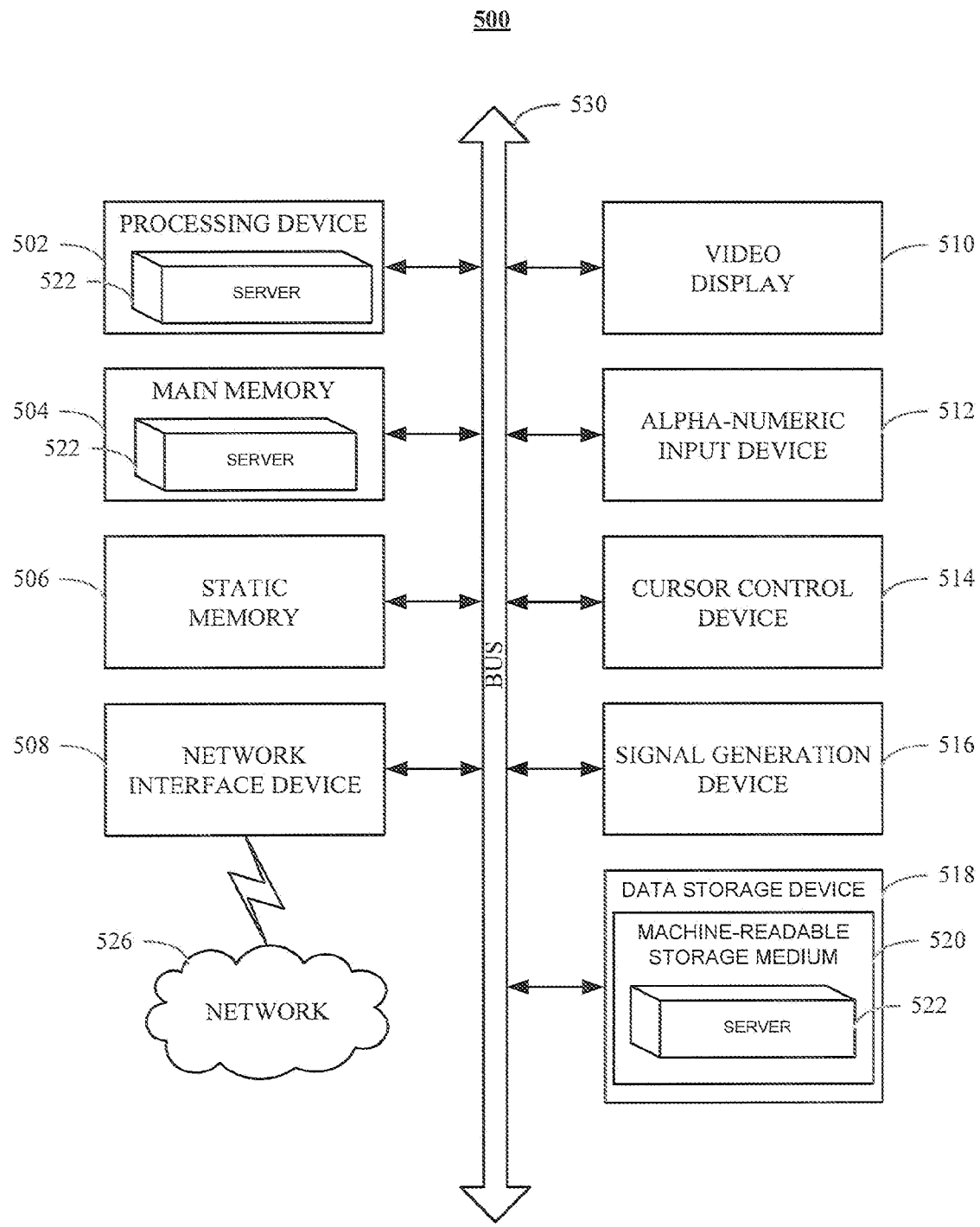
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the server 302, communicatively connected for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions 522 (e.g., the server 302) embodying any one or more of the methodologies of functions described herein. The server 302 may also reside, completely or at least partially, within main memory 504 and/or within processing device 502 during execution thereof by computer system 500; main memory 504 and processing device 502 also constituting machine-readable storage media. The server 302 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a programmed computer, a source signal stream comprising metadata and an advertisement space;
   extracting from the metadata, by the programmed computer, a channel identifier and information about an intended audience of interest to clients;
   identifying, by the programmed computer, a placement opportunity including an owner of the advertisement space based on the channel identifier;
   associating, by the programmed computer, the placement opportunity with a universal unique identifier, the universal unique identifier uniquely identifying the placement opportunity as a confirmed placement opportunity and uniquely identifying a starting location of the confirmed placement opportunity within the source signal stream and within an end-to-end operational system;
   purging, by the programmed computer, at least some of the extracted information about the intended audience when the owner of the advertisement space is identified as a specified network;
   transmitting, by the programmed computer, a placement request to an advertisement decision service for the confirmed placement opportunity in view of the universal unique identifier and in view of the extracted information about the intended audience remaining after purging;
   receiving, by the programmed computer, a placement response comprising an advertisement placement decision in view of the universal unique identifier and in view of the extracted information about the intended audience remaining after purging;
   inserting the placement response into the confirmed placement opportunity;
   receiving, by the programmed computer, a request for a portion of the remainder of the extracted information from a client; and,
   providing, by the programmed computer, the portion of the extracted information about the intended audience remaining after purging to the client when the client is the specified network and
   not providing, by the programmed computer, the portion of the extracted information about the intended audience remaining after purging to the client when the client is another network.

2. The method of claim 1, further comprising identifying an amount of information about the intended audience to purge and subsequently to fetch for the client based on a business arrangement between the client and a service provider.

3. The method of claim 1, further comprising targeting an advertisement decision to the intended audience based on the extracted information about the intended audience remaining after purging.

4. The method of claim 1, wherein the extracted information about the intended audience remaining after purging is at least one statistic of a national market.

5. The method of claim 4, further comprising charging a premium to the client for the at least one statistic.

6. The method of claim 5, wherein the premium charged is based on at least one of by network, by show, by time, or by device.

7. The method of claim 1, wherein at least one statistic is made available only to the client for a predetermined period of time.

8. The method of claim 1, wherein the purged information about the intended audience is personal identifiable information.

9. The method of claim 8, wherein the personal identifiable information identifies an individual person.

10. The method of claim 8, wherein the personal identifiable information is at least one of a hardware MAC address, a name, a post office address, a subscription or an order history, or a credit score.

11. The method of claim 1, wherein the purged information about the intended audience identifies a market associated with a regional or local service provider.

12. The method of claim 1, wherein the extracted information about the intended audience remaining after purging includes information that identifies a market associated with a regional or local service provider.

13. The method of claim 12, further comprising providing compensation to the regional or local service provider from the client in exchange for permitting the client to have access to the information that identifies the market associated with the regional or local service provider.

14. The method of claim 13, further comprising:
transmitting the private client identifier and the channel identifier to a subscriber information service; and
receiving, from the subscriber information service, a list of audience qualifiers including the extracted information about the intended audience correlated to the private client identifier and the channel identifier.

15. The method of claim 14, wherein purging at least some of the extracted information about the intended audience further comprises purging at least some of the audience qualifiers that identify an individual person or identifies a market associated with a regional or local service provider.

16. The method of claim 1, further comprising requesting an advertisement decision based on the placement opportunity identified.

17. The method of claim 1, further comprising obtaining the metadata from a content information service (CIS).

18. The method of claim 1, further comprising obtaining the owner of the advertisement space from a session server.

19. The method of claim 1, wherein the source signal stream further comprises content.

20. The method of claim 19, wherein content comprises video, audio, or an interactive overlay.

21. The method of claim 1, wherein designated time intervals for an advertising placement opportunity in the advertisement space corresponds to breaks, pre-rolls, post-rolls, mid-rolls, interstitials, pauses, and video-on-demand requests.

22. A system, comprising:
a memory;
a processing device, coupled to the memory, to:
receive a source signal stream comprising metadata and an advertisement space;
extract from the metadata a channel identifier and information about an intended audience of interest to clients;
identify a placement opportunity including an owner of the advertisement space based on the channel identifier;
associate the placement opportunity with a universal unique identifier, the universal unique identifier uniquely identifying the placement opportunity as a confirmed placement opportunity and uniquely identifying a starting location of the confirmed placement opportunity within the source signal stream and within an end-to-end operational system;
purge at least some of the extracted information about the intended audience when the owner of the advertisement space is identified as a specified network;
transmit a placement request to an advertisement decision service for the confirmed placement opportunity in view of the universal unique identifier and in view of the extracted information about the intended audience remaining after purging;
receive a placement response comprising an advertisement placement decision in view of the universal unique identifier and in view of the extracted information about the intended audience remaining after purging;
insert the placement response into the confirmed placement opportunity;
receive a request for a portion of the remainder of the extracted information from a client; and,
provide the portion of the extracted information about the intended audience remaining after purging to the client when the client is the specified network and
not provide the portion of the extracted information about the intended audience remaining after purging to the client when the client is another network.

23. A non-transitory computer readable storage medium including instructions that, when executed by a programmed computer, cause the programmed computer to perform operations comprising:
receiving, by the programmed computer, a source signal stream comprising metadata and an advertisement space;
extracting from the metadata, by the programmed computer, a channel identifier and information about an intended audience of interest to clients;
identifying, by the programmed computer, a placement opportunity including an owner of the advertisement space based on the channel identifier;
associating the placement opportunity with a universal unique identifier, the universal unique identifier uniquely identifying the placement opportunity as a confirmed placement opportunity and uniquely identifying a starting location of the confirmed placement opportunity within the source signal stream and within an end-to-end operational system;
purging, by the programmed computer, at least some of the extracted information about the intended audience when the owner of the advertisement space is identified as a specified network;
transmitting, by the programmed computer, a placement request to an advertisement decision service for the confirmed placement opportunity in view of the universal unique identifier and in view of the extracted information about the intended audience remaining after purging;
receiving, by the programmed computer, a placement response comprising an advertisement placement decision in view of the universal unique identifier and in view of the extracted information about the intended audience remaining after purging;
inserting the placement response into the confirmed placement opportunity;
receiving, by the programmed computer, a request for a portion of the remainder of the extracted information from a client; and,
providing, by the programmed computer, the portion of the extracted information about the intended audience remaining after purging to the client when the client is the specified network and not providing, by the programmed computer, the portion of the extracted information about the intended audience remaining after purging to the client when the client is another network.

\* \* \* \* \*